United States Patent
Cicchino et al.

(10) Patent No.: US 9,407,672 B2
(45) Date of Patent: Aug. 2, 2016

(54) SYSTEMS AND METHODS FOR REDUCING SIGNALLING IN AN INTERNET PROTOCOL TELEPHONY SYSTEM

(71) Applicant: VONAGE AMERICA INC., Holmdel, NJ (US)

(72) Inventors: Domenic Cicchino, Freehold, NJ (US); Kevin Huang, Princeton Junction, NJ (US)

(73) Assignee: VONAGE AMERICA INC., Holmdel, NJ (US)

( * ) Notice: Subject to any disclaimer, the term of this patent is extended or adjusted under 35 U.S.C. 154(b) by 44 days.

(21) Appl. No.: 14/067,329

(22) Filed: Oct. 30, 2013

(65) Prior Publication Data

US 2015/0117442 A1 Apr. 30, 2015

(51) Int. Cl.
| | |
|---|---|
| H04L 29/06 | (2006.01) |
| H04W 12/02 | (2009.01) |
| H04W 12/04 | (2009.01) |
| H04M 1/253 | (2006.01) |
| H04M 7/00 | (2006.01) |
| H04W 12/06 | (2009.01) |

(52) U.S. Cl.
CPC ........ *H04L 65/1069* (2013.01); *H04L 65/1073* (2013.01); *H04L 65/1076* (2013.01); *H04M 1/253* (2013.01); *H04M 7/006* (2013.01); *H04W 12/02* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2004/0131187 A1* | 7/2004 | Takao et al. | 380/255 |
| 2009/0037513 A1* | 2/2009 | Yoda et al. | 709/201 |
| 2010/0246439 A1* | 9/2010 | Heath et al. | 370/254 |

OTHER PUBLICATIONS

T. Guillet, R. Moalla, A. Serhrouchni, SIP Authentication based on HOTP, Proceedings of the 7th International Conference on Information, Communications and Signal Processing, Dec. 10, 2009, pp. 1-4.*
T. Guillet, M. Badra, Mutual Authentication for SIP: A semantic meaning for the SIP opaque values, Conference on New Technologies, Mobility and Security, Nov. 7, 2008, pp. 1-6.*
A. Ashar, J. van Bemmel, MAC address authentication in SIP, Apr. 25, 2005, pp. 1-3.*
Q. Qiu, Study of Digest Authentication for Session Initiation Protocol, Master's Thesis, Dec. 2003, pp. 1-27.*
M. Badra, T. Guillet, A. Serhrouchini, Random Values, Nonce and Challenges: Semantic Meaning versus Opaque and Strings of Data, IEEE 70th Vehicular Technology Conference, Sep. 23, 2009.*

* cited by examiner

*Primary Examiner* — Christopher Crutchfield
(74) *Attorney, Agent, or Firm* — Nixon & Vanderhye P.C.; Joseph Pagnotta

(57) ABSTRACT

A telephony communication setup request sent from a telephony device to an element of an IP telephony system includes a first encrypted code that is generated using one or more data items that are specific to the telephony device. The element of the IP telephony system receiving the setup request obtains the same data items locally and creates a second encrypted code. If the second code matches the first encrypted code, the telephony device and/or the setup request are authenticated, and the element of the IP telephony system proceeds to setup the requested telephony communication.

23 Claims, 8 Drawing Sheets

SYSTEMS AND METHODS FOR REDUCING SIGNALLING IN AN INTERNET PROTOCOL TELEPHONY SYSTEM

BACKGROUND OF THE INVENTION

The invention is related to telephony communications systems. More specifically, the invention is related to methods performed by an IP telephony system to setup and bill for telephony communications.

When a user of an IP telephony system wishes to conduct a telephony communication, the user's telephony device sends a telephony communication setup request to an element of the IP telephony system, such as a proxy server or a gateway. If the user's IP telephony device and the element of the IP telephony system communicate with one another using the Session Initiation Protocol (SIP), the telephony communication setup request is typically in the form of a SIP Invite message.

When an element of an IP telephony system such as a proxy server receives a SIP Invite message from a user's telephony device, the proxy server typically will first try to authenticate the user's telephony device as authorized to receive the requested telephony services. This usually involves messaging that passes back and forth between the proxy server and the user's telephony device. The authentication process also may involve messaging that passes between the proxy server and other elements of the IP telephony system if the proxy server must obtain information about the user's telephony device, or the user, to determine whether or not the user is authorized to receive the requested telephony services. It would be desirable to eliminate some of the messaging traffic that presently occurs during such an authentication process.

After a telephony communication that was carried via an IP telephony system has been completed, the IP telephony system gathers and records information about the telephony communication. This information is typically gathered by a call detail record (CDR) unit that generates one or more call detail records (CDRs) for the telephony communication. A billing unit of the IP telephony system uses information in the CDRs to determine if a user should be charged for the telephony communication, and if so, how much. The billing unit may obtain and utilize information about how much to charge for a communication from a rating unit.

A rating unit supplies information about how much individual users should be charged for a telephony communication. The rating unit tracks the billing or rate plans that apply to each user, and the rating unit supplies the charge information to the billing unit or the CDR unit for billing purposes. In some embodiments, the rate information is recorded into the CDR. However, in alternate embodiments, the rate information may be provided directly to a billing system that calculates charges based on information in the CDRs.

In some IP telephony systems, the CDR unit or the billing unit sends every individual CDR to the rating unit and requests charge information for the telephony communication that gave rise to the CDR. However, the CDR unit and/or the billing unit do not necessarily require such charge information for all CDRs. For example, if a CDR is for an outgoing call that originated from a user's telephony device and that was placed to a telephone number in a different country, it is necessary to charge the user for the call. On the other hand, if a CDR is for an inbound call that was completed to a user's telephony device, the user will not be charged for the incoming call.

Rather than sending all CDRs to the rating unit, it would be desirable to send to the rating unit, only those CDRs that are for telephony communications that will result in charges to the user. Operating in this fashion would eliminate unnecessary message traffic, and reduce the burden placed on the rating unit.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
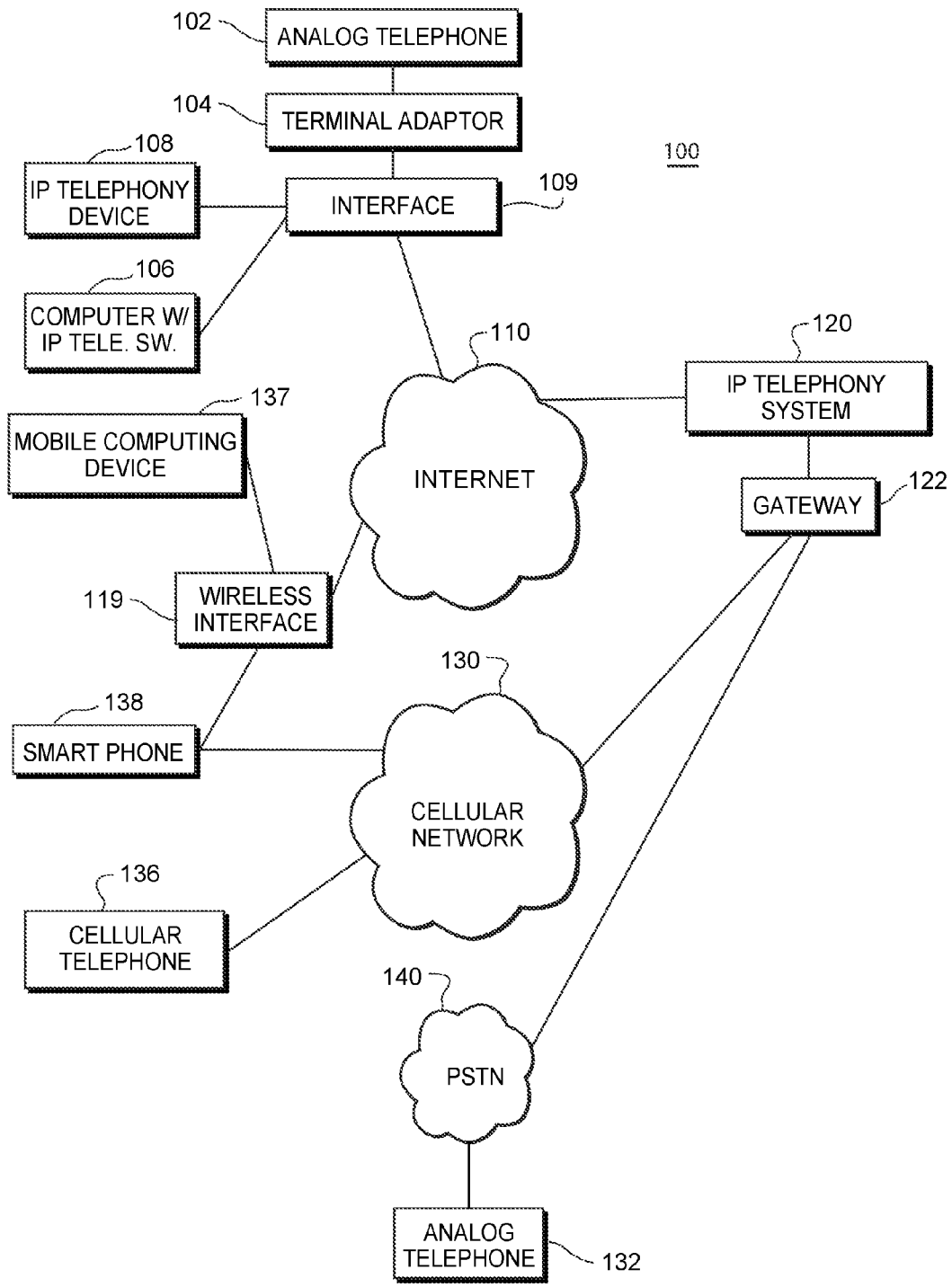
FIG. 1 is a diagram of a communications environment including various elements which are associated with an Internet protocol (IP) telephony system in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to a publicly switched telephone network (PSTN) 140 and/or a cellular network 130 via one or more gateways 122.

The gateway 122 allows users and devices that are connected to the PSTN 140 or cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110 via a data network interface 109. The IP telephone 108 could be connected to the data network interface 109 via a wired or wireless connection.

Alternatively, a customer could utilize a normal analog telephone 102 which is connected to the Internet 110 via a terminal adapter 104 and the data network interface 109. The terminal adapter 104 converts analog signals from the telephone 102 into data signals that pass over the Internet 110, and vice versa. Analog telephony devices include, but are not limited to, standard telephones and document imaging devices such as facsimile machines. A configuration using a terminal adapter 104 is common where the analog telephone 102 is located in a residence or business In addition, a customer could utilize a computer that is running IP telephony software 106 to place and receive IP based telephone calls, and to access other IP telephony systems (not shown). Here again, the computer running IP telephony software 106 would access the Internet 110 via the data network interface 109. In some instances, the IP telephony software could be assigned its own telephone number. In other instances, the IP telephony software could be associated with a telephone number that is also assigned to an IP telephone 108, or to a terminal adaptor 104 that is connected to an analog telephone 102.

In addition, a mobile computing device 137 which is running IP telephony software could also be used to place and receive telephone calls through the IP telephony system 120. The mobile computing device 137 accesses the Internet 110 via a wireless data network interface 119. The wireless data network interface could be a WiFi or WiMax router, or any other type of wireless data interface device capable of communicating wirelessly with the mobile computing device 137.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. A third party using a cellular telephone 136 could also place a call to an IP telephony system 120 customer, and the connection would be established in a similar manner, although the first link would involve communications between the cellular telephone 136 and a cellular telephone network 130.

A smart phone 138 which includes cellular telephone capabilities could also be used to conduct telephony communications through both the IP telephony system 120 and the cellular network 130. For example, an IP telephony software application running on the smart phone 138 could communicate with the IP telephony system 120 via the Internet 110. The smart phone 138 could access the Internet 110 via the wireless data network interface device 119, or via a data channel of the cellular network 130. Of course, alternate embodiments could utilize any other form of wired or wireless communications paths to enable communications.

Users of the IP telephony system 120 are able to access the service from virtually any location where they can connect to the Internet 110. Thus, a customer could register with an IP telephony system in the U.S., and that customer could then use an IP telephone 108 located in a country outside the U.S. to access the services. Likewise, the customer could also utilize a computer outside the U.S. that is running IP telephony software to access the IP telephony system 120. Further, in some instances a user could place a telephone call with the analog telephone 132 or the cellular telephone 136 that is routed through the PSTN 130 or cellular network 140 to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system 120 network. Thus, the user is able place a long distance call using lower cost IP telephony service provided by the IP telephony system 120, rather than a higher cost service provided by the PSTN 140 or cellular network 130.

Figure 2:
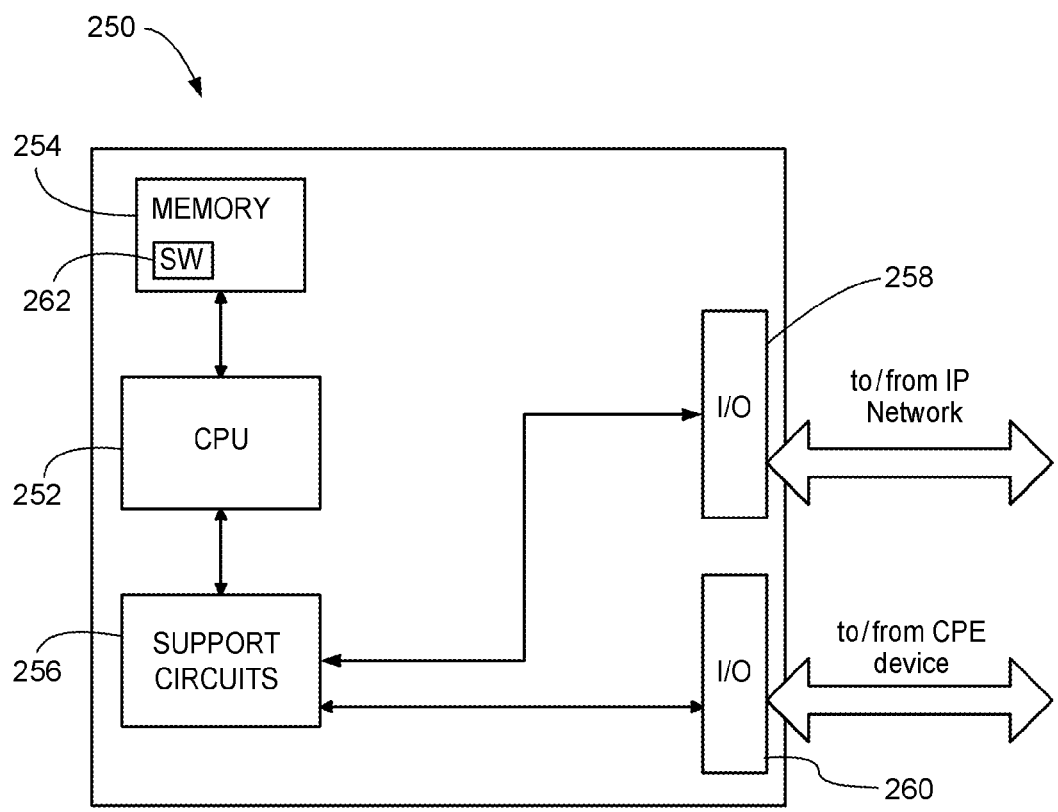
FIG. 2 is a diagram of various elements of a processor that forms part of an IP telephony system or an IP telephony device according to an embodiment of the invention.

FIG. 2 illustrates elements of a computer processor 250 that can be used as part of the IP telephony system 120 or a telephony device to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

References to an "IP telephony device" appear in both the foregoing and following descriptions. This term is used to refer to any type of device which is capable of interacting with an IP telephony system to conduct a communication. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
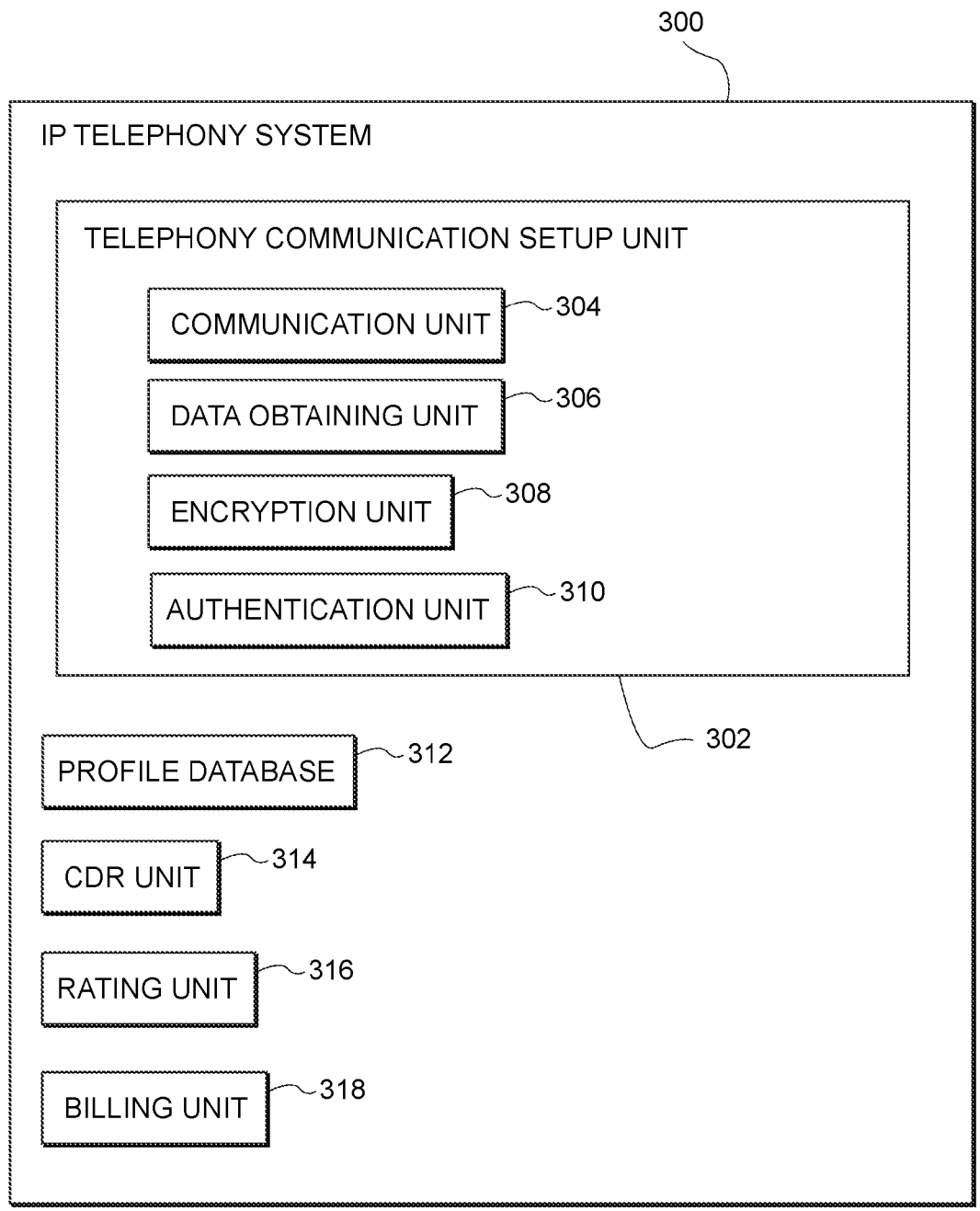
FIG. 3 is block diagram illustrating various elements of an IP telephony system according to an embodiment of the invention.

FIG. 3 illustrates selected elements of an IP telephony system 300 according to one embodiment of the invention. The IP telephony system 300 includes a telephony communication setup unit 302 which is responsible for setting up telephony communications. This can include both outgoing telephony communications requested by a user of the IP telephony system 300, and incoming telephony communications where a third party has requested that a telephony communication be setup to a telephony device of an IP telephony system 300 user.

The telephony communication setup unit 302 includes a communications unit 304 that communicates with user telephony devices and other elements of the IP telephony system to setup requested telephony communications. A data obtaining unit 306 obtains information about users and their telephony devices, as will be explained below. An encryption unit 308 creates encrypted codes which are used by an authentication unit 310 to help authenticate a user's telephony device.

The IP telephony system 300 further includes a profile database 312 that stores information about system users and their telephony devices. A CDR unit 314 receives information from various elements of IP telephony system 300, and stores call detail records (CDRs) for individual telephony communications that were carried by the IP telephony system 300. A rating unit 316 provides information about how to charge individual users for telephony communications that are carried by the IP telephony system 300. This can include information about calling or rate plans to which the users have subscribed, as well as per-minute charges or per-message charges that are to be applied for a user's communications. The rating unit 316 can provide such information in any of multiple different formats depending on the user and the type of telephony communication that is involved. A billing unit 318 uses information provided by the CDR unit and the rating unit to bill individual system users for their communications.

The above described elements of the IP telephony system 300 are in no way intended to be limiting. An IP telephony system operating as recited in the claims would likely include many other elements that perform many alternate functions.

Figure 4:
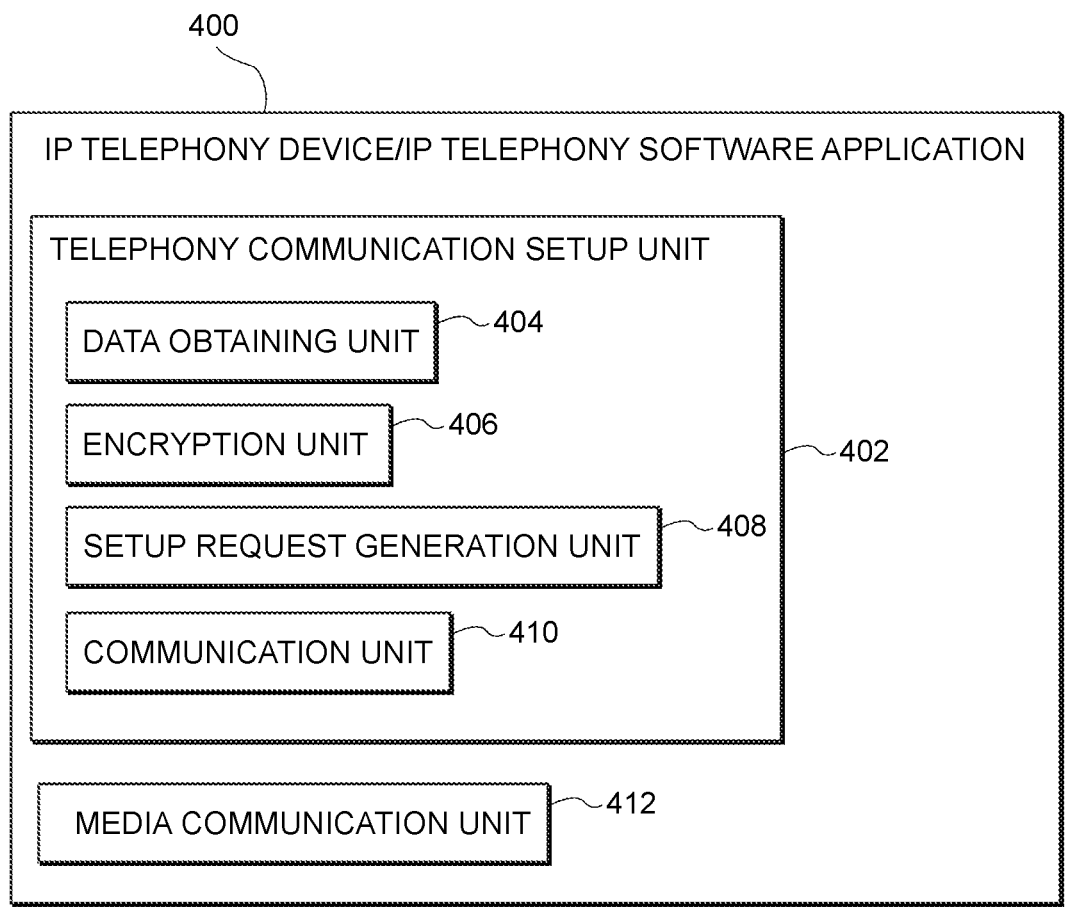
FIG. 4 is a block diagram of various elements of an IP telephony device or an IP telephony software application.

FIG. 4 illustrates selected elements of a user's IP telephony device. Alternatively, FIG. 4 could depict elements of an IP telephony software application 400 that would be running on a smart phone or a computing device. Regardless of whether the elements are present on an IP telephony device, or the elements are implemented via an IP telephony software application, the elements would operate in a similar, although not identical, manner.

The IP telephony device/IP telephony software application 400 includes a telephony communication setup unit 402 which is responsible for helping to setup outgoing and incoming telephony communications. The telephony communication setup unit 402 includes a data obtaining unit 404 that is capable of obtaining various items of data or information that are specific to the IP telephony device/IP telephony software application 400, and/or to the user of the IP telephony device/IP telephony software application 400. Examples of such data items are explained below.

The telephony communication setup unit 402 also includes an encryption unit 406 that encrypts information and/or data items obtained by the data obtaining unit 404 to create one or more encrypted codes. A setup request generation unit 408 generates a telephony communication setup request when a user wishes to setup a new telephony communication, such as an outgoing telephone call. The setup request generation unit 408 inserts the encrypted code(s) created by the encryption unit 406, and possibly additional information, into a selected portion of the telephony communication setup request. A communication unit 410 then sends the telephony communication setup request to an element of an IP telephony system 300, such as a proxy server, which will assist in setting up the desired telephony communication.

The IP telephony device/IP telephony software application 400 also includes a media communication unit 412 that is responsible for communicating data packets bearing the media of a telephony communication with elements of the IP telephony system via a data network connection.

Although FIG. 4 depicts selected elements of an IP telephony device/IP telephony software application, other elements that perform other functions could also be present.

Figure 5:
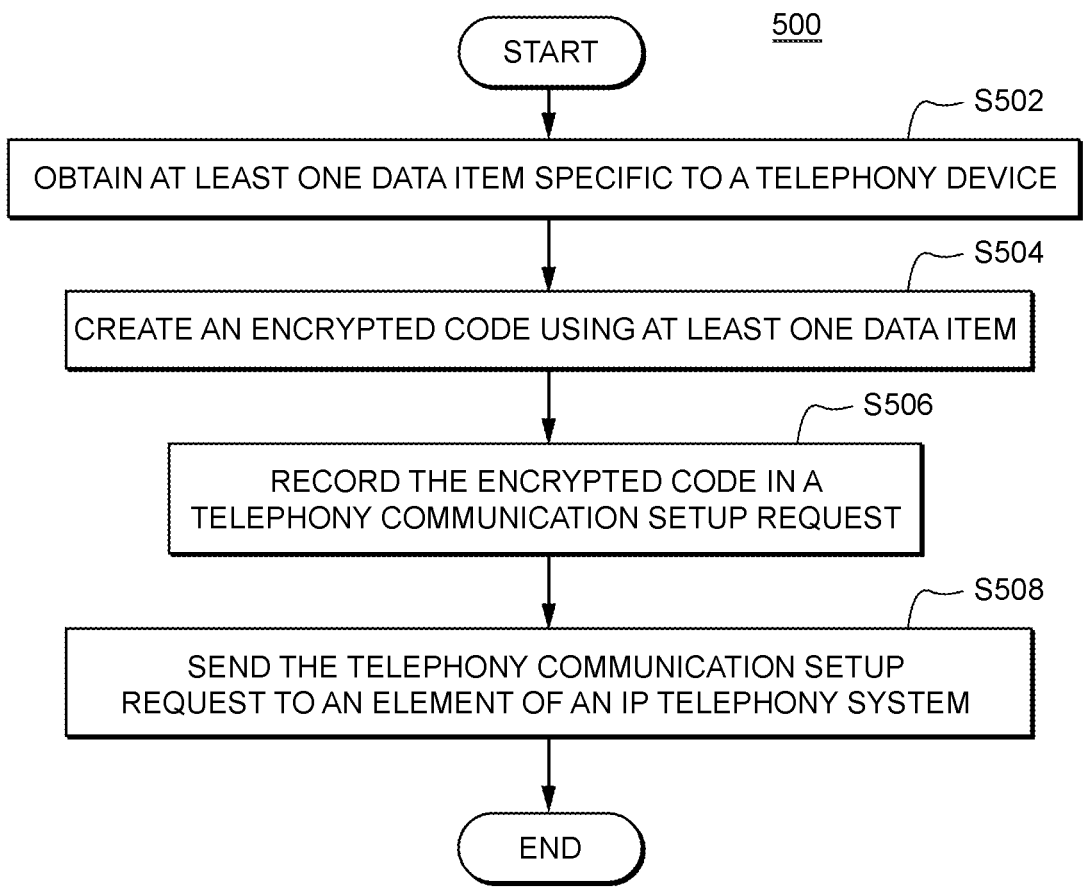
FIG. 5 is a flowchart illustrating steps of a method of that would be performed by a user's telephony device to generate and send a telephony communication setup request to an element of an IP telephony system.

FIG. 5 depicts steps of a method 500 that is performed by a telephony communication setup unit 402 of an IP telephony device/IP telephony software application 400 to generate and send a telephony communication setup request. This method is performed when a user requests the setup of a new outgoing telephony communication, such as a new outgoing telephone call. Although the method could be performed by either an IP telephony device or an IP telephony software application, the following description assumes that an IP telephony device is performing the steps of the method.

The method 500 begins and proceeds to step S502, where a data obtaining unit 404 obtains one or more items of data or information that are specific to the IP telephony device 400. The obtained data could include an identification number assigned to the IP telephony device 400, such as a serial number or a media access control (MAC) address. The obtained data could also include a telephone number that is associated with or assigned to the IP telephony device 400. The obtained data could also include a character representation of the last time at which the telephony device registered with the IP telephony system over a data network. The obtained data could include any other item of data or information, or any combination of data items, that is likely to be specific or unique to the IP telephony device.

Each item of data or information obtained in step S502 could have its own unique format. Each item of data or information could include letters, numbers and other symbols. The characters could be separated by delimiters such as commas, dashes, colons, symbols or punctuation marks. Alternatively, the characters could simply be an unbroken string of characters that are provided in a predetermined format.

In some embodiments, the obtained data or information could be used in the format in which it is obtained. In other instances, the data obtaining unit 404 and/or the encryption unit 406 may transform the obtained data or information into another format, which could include adding additional characters or symbols or removing certain characters or symbols.

In step S504, the encryption unit 406 of the telephony communication setup unit 402 uses the obtained items of data or information to create an encrypted code. Any sort of encryption scheme and/or encryption key could be used for this purpose. However, as will be explained below, an element of the IP telephony system must be capable of duplicating the efforts of the encryption unit 406 to generate a substantially identical encrypted code from the same items of information or data.

The method then proceeds to step S506, where a setup request generation unit 408 generates a telephony communication setup request which is to be sent to an element of the IP telephony system. The encrypted code is inserted into the telephony communication setup request. The telephony communication setup request could be a SIP Invite message. However, when a different communication protocol is being used, the telephony communication setup request could take other forms.

If SIP is being used, and the telephony communication setup request is a SIP Invite message, the encrypted code is inserted into a field of the Invite message, such as the call-ID field. In some instances, only the encrypted code generated by the encryption unit 406 is inserted into a field of the Invite message. In other instances, additional information is also inserted into a field of the Invite message. For example, the telephone number assigned to or associated with the IP telephony device could be appended to either the front or the back of the encrypted code, and the combination is then inserted into a field of the Invite message. In alternate embodiments, other items of information or data could be added to the encrypted code, and the combination is inserted into a field of the Invite message.

In IP telephony systems that utilize the SIP messaging protocol, it is desirable to utilize unique Call-IDs for each telephony communication. Typically, the first message that is generated for a new telephony communication is the SIP Invite message. Thus, when a user telephony device creates a new SIP Invite message as part of a method of requesting the setup of a new telephony communication, it is desirable to generate a unique call-ID, and to insert that unique call-ID the call-ID field of the SIP Invite message. Several more communications regarding the telephony communication will be generated and communicated between the user telephony device and elements of the IP telephony system, and each of those communications will include the same call-ID value that was originally established in the SIP Invite message that initiated the setup of the telephony communication.

If the encrypted code is inserted into the call-ID field of a SIP Invite message, it is desirable for the encrypted code to be unique. As mentioned above, the encrypted code can be based on the telephone number associated with or assigned to the user telephony device, and a MAC address of the user telephony device. However, these two elements would rarely change. Thus, if these were the only two elements used to create the encrypted code, the encrypted code would not be unique, it would be the same for every telephony communication.

However, if the encrypted code is also based on a character representation of the last time at which the user telephony device registered with the IP telephony system, the encrypted could would almost certainly be unique—at least within any given twenty four hour period. User telephony devices typically conduct a registration operation on a frequent basis, in some instances, as often as every twenty seconds. Mobile telephony devices may be configured to conduct registration operations less frequently, to conserve battery power, but would still tend to re-register with the system in between each telephony communication. Thus, including a character representation of the last time at which the user telephony device registered with the system in the string of characters used to generate the encrypted code is likely to result in the generate of unique call-ID values.

In some embodiments, a call ID is generated for a new telephony communication setup request in the normal manner, meaning a unique call-ID value is generated, and the encrypted code is appended to that unique call-ID value. The combination is then inserted into the call-ID field of a SIP Invite message. In other embodiments, both the telephone number associated with or assigned to the user telephony device and the encrypted code are combined with a call ID generated in the normal manner, and the combination is inserted into the call-ID field of a SIP Invite message. Of course, other combinations of data items could also be combined with encrypted code to create a string of characters that is inserted into the call-ID field of a SIP Invite message.

The method then proceeds to step S508, where the telephony communication setup request created in step S506 is sent to an element of the IP telephony system by the communication unit 410 of the telephony communication setup unit 402. The element of the IP telephony system to which the telephony communication setup request is sent could be a proxy server, a gateway, or some other element of the IP telephony system responsible for assisting a user telephony device in setting up a new telephony communication. The method then ends.

As noted above, the method illustrated in FIG. 5 could be performed by either an IP telephony device or an IP telephony software application. Thus, the foregoing description, which assumes that the method was performed by an IP telephony device, should in no way be considered limiting. Other similar methods that are performed by an IP telephony software application also fall within the scope of the invention and the following claims.

Also, portions of the foregoing description assumed that the user was requesting the setup of a new outgoing telephone call. In alternate instances, the user could be requesting an alternate type of telephony communication, such as a new outgoing SMS or MMS message. A method as described above could be part of an effort to setup virtually any time of new outgoing telephony communication.

In known telephony systems, when an element of the IP telephony system receives a telephony communication setup request from a user telephony device, the element of the IP telephony system sends an authentication request message back to the IP telephony device. The IP telephony device must then send back an appropriate authentication message to prove that it is authorized to receive the requested telephony communication services. However, when the original telephony communication setup request message is formatted as explained above, the element of the IP telephony system that receives the new telephony communication setup request can authenticate the telephony device, or the setup request, using the encrypted code that is present in the setup request. There is no need for the element of the IP telephony system to send an authentication setup request message to the user telephony device, and there is no need for the user telephony device to send back an appropriate authentication message.

Figure 6:
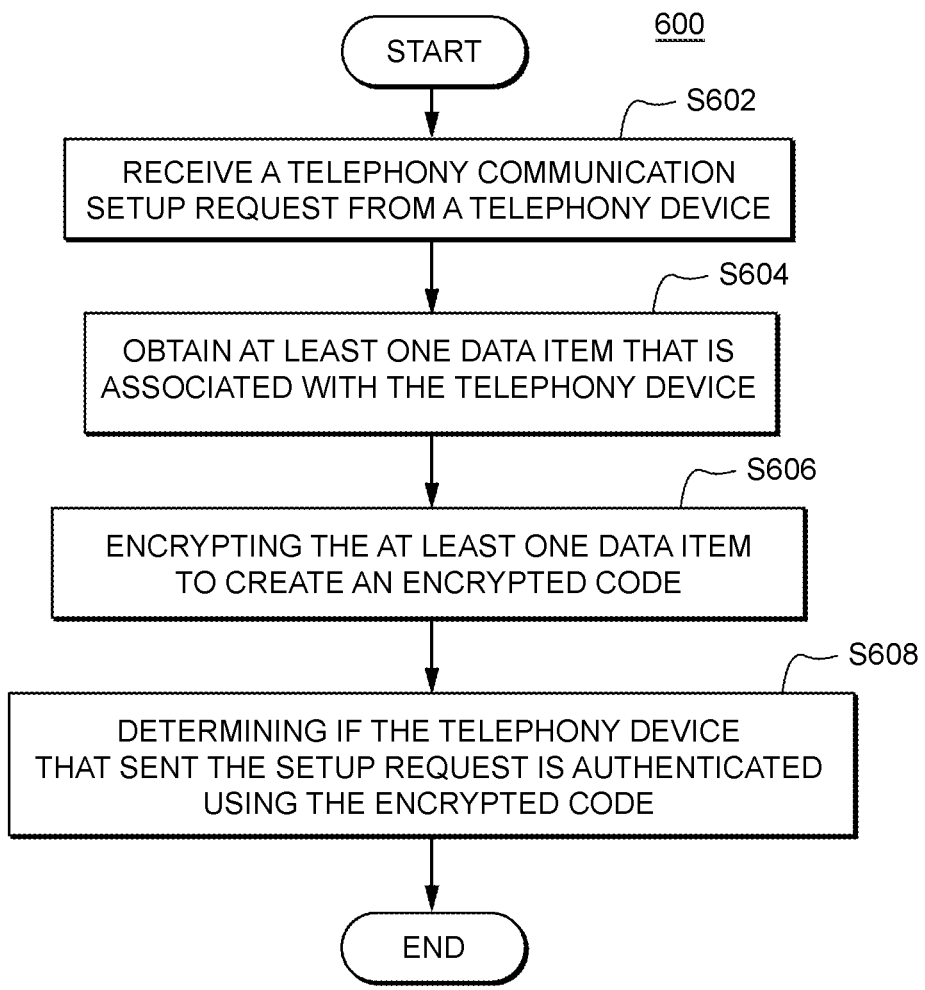
FIG. 6 is a flowchart illustrating steps of a method that would be performed by an element of an IP telephony system to authenticate a user's telephony device.

Steps of a method of performing the authentication are illustrated in FIG. 6. The method would be performed by a telephony communication setup unit 302 of an IP telephony system 300, as illustrated in FIG. 3. The telephony communication setup unit 302 could be resident on a proxy server, a routing gateway, or some other element of the IP telephony system 300. Also, in some embodiments, portions of the telephony communication setup unit could be resident on multiple different elements of the IP telephony system 300.

The method 600 begins and proceeds to step S602, where a communication unit 304 of the telephony communication setup unit 302 receives a telephony communication setup request from a user telephony device. As explained above, an encrypted code is present in the telephony communication setup request. The encrypted code will be based on one or more items of data or information that are specific to the user telephony device or the user. As also mentioned above, in some embodiments, the encrypted code is recorded in the call-ID field of a SIP Invite message. In alternate embodiments, other message types could be used, and the encrypted code could be located in a different portion of the setup request message.

In step S604, the data obtaining unit 306 of the telephony communication setup unit 302 obtains the same items of data or information that were used to create the encrypted code present in the telephony communication setup request. This information is obtained from other elements of the IP telephony system based on the "FROM" telephone number contained in the telephony communication setup request, which can be used to identity the user telephony device that sent the setup request. In some embodiments, the items of data or information specific to the user telephony device are retrieved from a profile database 312 of the IP telephony system 300. However, in alternate embodiments, the items of data or information could be retrieved from other sources or locations.

In step S606, the encryption unit 308 of the telephony communication setup unit 302 uses the obtained items of data or information to create an second encrypted code. The same encryption algorithm and/or encryption key that was used by the telephony device to create the encrypted code in the telephony communication setup request is again used by the encryption unit 308 to create the second encrypted code. Because the same items of data or information are used, and because the same encryption algorithm or encryption key is used, the second encrypted code should be identical to the first encrypted code.

In step S608 the authentication unit 310 of the telephony communication setup unit 302 compares the second encrypted code to the encrypted code present in the telephony communication setup request received from the user telephony device. If the encrypted codes match, the user telephony device that sent the setup request is authenticated, and the element of the IP telephony system that received the setup request proceeds to setup the requested telephony communication.

If the encrypted codes do not match, authentication fails. In some embodiments the element of the IP telephony system would then refuse to setup the requested telephony communication. In alternate embodiments, the authentication failure may only trigger the element of the IP telephony system to send an authentication request message to the user telephony device. If the user telephony device is able to respond appropriately, authentication would still be accomplished, and setup of the requested telephony communication could proceed.

As mentioned above, in known systems, when an element of the IP telephony system receives a telephony communication setup request, the element of the telephony system sends an authentication request message to the user telephony device, and the user telephony device sends back a reply message with information that allows the element of the IP telephony system to authenticate the user telephony device as authorized to receive the requested telephony communication services. In a scheme as described above, information in the original telephony communication setup request is used to authenticate the user telephony device, which eliminates the need for the element of the IP telephony system to send an authentication request message to the user telephony device, as well as the need for the user telephony device to send a reply message. Thus, overall message traffic over the data network is reduced. While the bandwidth savings for a single call may not be significant, in a large IP telephony system that processes hundreds of thousands of calls every day, the overall bandwidth savings can become significant.

As mentioned above, one of the data items that may be incorporated into the encrypted code generated by the user telephony device and embedded in a telephony communication setup request is a character representation of the last time at which the user telephony device conducted a registration operation with the IP telephony system. In some instances, this could potentially create an authentication problem. The problem arises because a user telephony device will sometimes send a registration message to the IP telephony system that never arrives at a registration unit of the IP telephony system. A data transmission error could cause this to happen. When this occurs, the user telephony will believe that the last registration request occurred at one date/time, and the IP telephony system will believe that the last registration request occurred at a different, previous date/time.

If the scheme described above is used to authenticate telephony communication setup request messages, and the date/time of the last registration is one of the data items incorporated into the encrypted codes, the encrypted code generated by the user telephony device will not be the same as the encrypted code generated by the element of the IP telephony system. As a result, authentication will fail.

One way to alleviate this problem is for the user telephony device to track the date/time of both the last registration, and the second-to-last registration. When the user telephony device creates the telephony communication setup request, it creates both a first encrypted code that incorporates a character representation of the date/time at which the last registration occurred, and a second encrypted code that incorporates a character representation of the date/time at which the second-to-last registration occurred. Both the first and second encrypted codes are then inserted into the telephony communication setup request.

When the element of the IP telephony system receives the telephony communication setup request, it obtains the necessary data items and creates an encrypted code as described above. During the comparison step, the encrypted code generated by the element of the IP telephony system is compared to both of the encrypted codes in the setup request. If there is a match to either of the encrypted codes in the setup request, the setup request is considered authenticated.

As mentioned above, using a character representation of the last time at which the user telephony device registered with the IP telephony system as part of the input used to generate an encrypted code helps to ensure that the encrypted code is unique each time an encrypted code is created by a user telephony device. This, in turn, makes it possible for the encrypted code to be used as the call-ID value of a SIP Invite message that initiates a new telephony communication. However, if a user telephony device is configured to perform registration operations on an infrequent basis, as may be the case for mobile telephony devices, simply using a character representation of the last registration time may not be sufficient to ensure the encrypted codes are unique for two consecutive telephony communications initiated by the same user telephony device.

Another way in which a user telephony device might generate the encrypted code that is inserted into a call-ID field of a SIP Invite message is to utilize a character representation of the current time, rounded to the nearest second, as part of the input used to generate the encrypted code. Of course, the element of the IP telephony system that received the Invite message must be capable of creating a matching encrypted code for authentication purposes. Thus, the time used by the user telephony device to create the encrypted code can be the time at which the last registration occurred, plus the number of seconds since that time, rounded to the nearest second.

Under this scenario, when the user telephony device needs to create the encrypted code, the user telephony device determines the time at which it performed the last registration operation, and the number of seconds that has passed since that time is added to the last registration time to create a character representation of the current time. That character representation is then used as part of the input for generating the encrypted code that is inserted into a call-ID field of a SIP Invite message. The user telephony device then sends the SIP Invite message to an element of the IP telephony system that will assist in setting up the telephony communication.

When the element of the IP telephony system receives the SIP Invite message, it consults other elements of the IP telephony system, such as a profile database, to obtain the last time at which the user telephony device conducted a registration operation, and any other data items that were used to create the encrypted code. The element of the IP telephony system then uses the same encryption algorithm or encryption key to create a second encrypted code, and the second encrypted code is compared to the encrypted code in the Invite message to determine if there is a match. If so, the Invite message is authenticated. If not, additional steps are taken.

If the first encrypted code generated by the element of the IP telephony system does not match the encrypted code in the Invite message, the element of the IP telephony system adds one second to the time at which the user telephony device last registered to create a new potential time representation, and the new time representation is used to create another encrypted code. The new encrypted code is compared to the encrypted code in the Invite message to see if there is a match. If not, this process repeats, and during each repeat of the process, another second is added to the last time at which the user telephony device last registered to create a new time representation. If the process repeats enough times to cover a full typical registration period for the user telephony device, and none of the encrypted codes created by the element of the IP telephony system match the encrypted code in the Invite message, authentication fails. This type of a process ensures that the encrypted code in each SIP Invite message is unique, and still allows the element of the IP telephony system to create a matching encrypted code for validation purposes.

The above examples provided only a limited number of alternatives for the information that is incorporated into an encrypted code. Many other data items could be incorporated into an encrypted code. Also, any other items of data or information could be paired with an encrypted code and inserted into a telephony communication setup request. Ideally, however, the items of data and information that are used by a telephony device to create an encrypted code are also available to the element of the telephony device that receives the telephony communication setup request such that the element of the IP telephony system can independently create a matching encrypted code from the same items of data and information.

In the foregoing examples, when an element of the IP telephony system receives a telephony communication setup request which includes an encrypted code, the element of the IP telephony system gathers items of information that were used to create the encrypted code from local data sources, create a second encrypted code using the obtained information, and compares the second encrypted code to the encrypted code in the setup request. In alternate embodiments, the authentication procedure could be accomplished in a different fashion.

Figure 7:
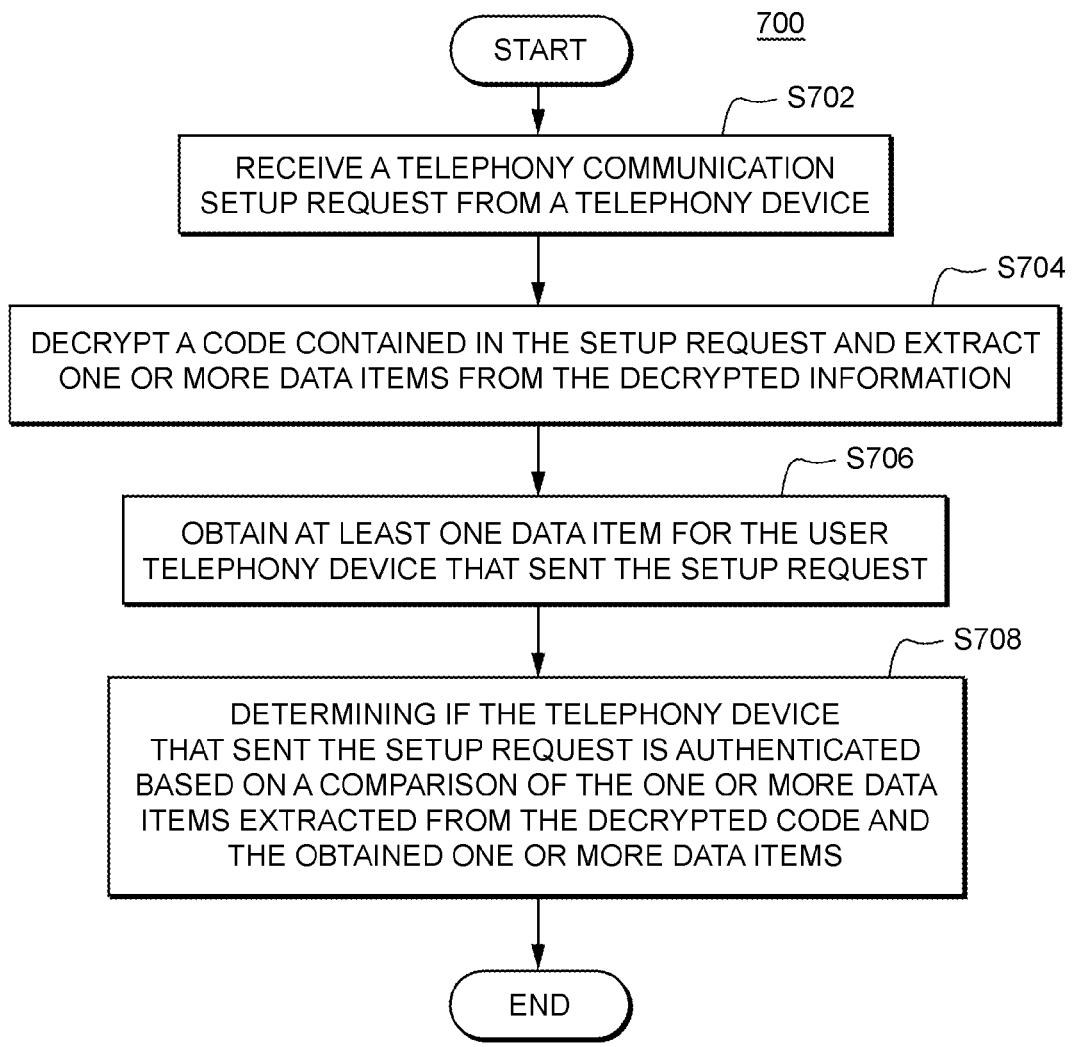
FIG. 7 is a flowchart illustrating steps of an alternate method that would be performed by an element of an IP telephony system to authenticate a user's telephony device.

FIG. 7 illustrates steps of an alternate method 700 for authenticating a user telephony device based on an encrypted code in a telephony communication setup request sent by the user telephony device. The method begins and proceeds to step S702, where an element of the IP telephony system receives a telephony communication setup request from a user telephony device that includes an encrypted code. In step S704, the element of the IP telephony system decrypts the encrypted code to obtain a character string. One or more data items that were originally used by the user telephony device to create the encrypted code are then extracted from the character string. The way in which the element of the telephony device accomplishes decryption of the code will vary depending on how the encrypted code was created in the first place. However, encryption and decryption schemes are well known to those of ordinary skill in the art.

In some embodiments, the element of the IP telephony system that receives the telephony communication setup request conducts the decryption step. In alternate embodiments, the element of the telephony system may pass the encrypted code to another element of the IP telephony system for decryption. In still other embodiments, the element of the IP telephony system that receives the telephony communication setup request may employ assets of the IP telephony system, or other assets that are available via a data network, to accomplish the decryption of the encrypted code in the telephony communication setup request.

In some embodiments, such as where only a single data item is used to create the encrypted code, extracting a data item from the decrypted character string will be relatively easy. In fact, the entire character string could correspond to a single data item that was originally used to create the encrypted code. In alternate embodiments, such as where multiple items of data or information were used to create the encrypted code, it may be necessary to extract the multiple items of data or information from the decrypted data according to a pre-determined format.

In step S706, the element of the IP telephony system obtains the same data items or information that was originally used by the user telephony device to create the encrypted code from local sources. As explained above, this information may be obtained from a profile database or other elements of the IP telephony system.

In step S708, the element of the IP telephony system then compares the obtained data items or information to the corresponding data items or information that were extracted from the decrypted character string. If the items of data or information obtained locally match the items of data or information extracted from the decrypted character string, the user telephony device is authenticated. If the data does not match, the authentication fails.

Another use for the information included in a telephony communication setup request relates to the systems and methods that bill a user for use of an IP telephony system. In some of the methods described above, certain information is included in the call-ID field of a SIP Invite message sent from a user telephony device to an element of an IP telephony system. This first call setup request message establishes the call-ID that will be used for the duration of the telephony communication. The call-ID subsequently appears in multiple messages that pass between other elements of the IP telephony system as the IP telephony system provides the user with the requested telephony communication services.

If the telephone number assigned to or associated with the user telephony device is included in the call ID field of a telephony communication setup request, the telephone number can be used by certain elements of the IP telephony system to reduce or eliminate unnecessary message traffic, and to reduce the burden placed on a rating unit that is responsible for providing information about what to charge a user for an outgoing telephony communication. Details are discussed below.

As illustrated in FIG. 3, the IP telephony system 300 can include a CDR unit 314 that generates and records call detail records (CDRs) for telephony communications handled by the IP telephony system 300. Because of the way the various elements of the IP telephony system 300 interact to provide telephony services, it is common for multiple CDRs to be generated for a single telephony communication.

A rating unit 316 of the IP telephony system provides information about what to charge a user for a telephony communication. Different users are typically on different rate plans. The rating unit 316 tracks which users are on which rate plans, and the rating unit 316 provides this information to either or both of the CDR unit 314 and a billing unit 318.

A telephony communication involving a user telephony device can be one of multiple different types. In some instances, the telephony communication is an outgoing telephony communication that was initiated from a user telephony device, and which is placed to a telephony device served by a different telephony system. In this instance, the user may be charged for placing an outgoing telephony communication to a telephony device that is only reachable via a different telephony system On the other hand, a telephony communication could be an incoming telephony communication initiated by a user of a different telephony system who is calling a user of the IP telephony system. In most cases, at least in the United States, the IP telephony system user is not charged for incoming telephony communications.

In known systems, each time that a CDR is generated by the CDR unit 314 in connection with a telephony communication, the CDR unit 314 makes a request to the rating unit 316 to determine the rate that is to be charged for the telephony communication. As mentioned above, the rate could depend on the identity of the IP telephony system user, and the rate plan that applies to the user. The rate, and/or a representative rate code, is then recorded in the CDR. However, it is inherently inefficient for the CDR unit 314 to make rating requests for all CDRs. Some CDRs will be for outgoing telephony communications initiated by an IP telephony system user, and a rate will be needed for those communications. However, some CDRs will be for incoming telephony communications. And because the user is not charged for incoming communications, there is no need to obtain a rate for an incoming communication from the rating unit 316. However, the CDR unit 314 has a difficult time determining whether a CDR is for an incoming or an outgoing telephony communication. Typically, there is not information present in a CDR which indicates that the CDR relates to an incoming communication or an outgoing communication. Or said another way, typically there is no information in a CDR that indicates whether a system user will be charged for the communication that gave rise to the CDR. And for this reason, the CDR unit 314 requests a rate for all CDRs.

In the above description, when a user telephony device generates a telephony communication setup request for a new outgoing telephony communication, the user telephony device establishes a call-ID value for the telephony communication, and this value is inserted into the call-ID field of the telephony communication setup request. As mentioned above, the value inserted into the call-ID field could include the telephone number associated with or assigned to the user telephony device. This call-ID is then replicated in additional call signaling for the telephony communication. This call-ID value will also appear in the CDRs that are generated for the telephony communication.

When the CDR unit 314 generates a CDR for a telephony communication, the CDR unit 314 can review the call-ID to determine if the telephone number of the user telephony device appears in the call-ID value. The telephone number can be obtained from the FROM field of the CDR, and/or in the FROM header of a SIP message that has been generated for the communication. If so, this would be an indication that a user telephony device initially requested the telephony communication, and that the telephony communication therefore was an outgoing telephony communication. On the other hand, if the telephone number of the user telephony device is not present in the call-ID field, this would indicate that the telephony communication was not initiated by a user telephony device, meaning the communication must be an incoming telephony communication. This difference in the call-ID field value provides a means for the CDR unit 314 to distinguish between CDRs generated for an incoming communication, which do not require rating information, and CDRs generated for outgoing communications, which do requiring rating information.

Figure 8:
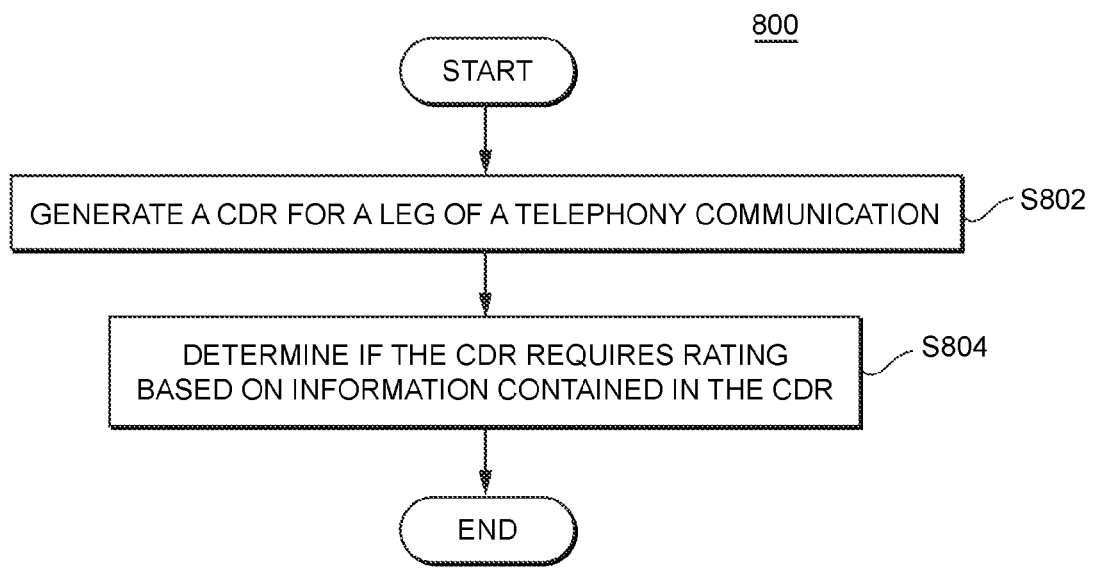
FIG. 8 is a flowchart illustrating steps of a method of determining if a call detail record (CDR) should be sent to a rating unit for purposes of obtaining charge information.

FIG. 8 illustrates steps of a method that would be performed by a CDR unit 314 to determine if it is necessary to consult a rating unit 316 to obtain rate information for a particular CDR. The method 800 begins and proceeds to step S802, where the CDR unit 314 generates a CDR for a telephony communication using information reported from one or more elements of the IP telephony system 300. Next, in step S804 the CDR unit 314 determines whether it is necessary to consult the rating unit 316 to obtain rating information. This is accomplished by reviewing the call-ID value for the CDR. If the call-ID value includes the telephone number of the user telephony device that was involved in the telephony communication, the CDR unit 314 determines that the CDR relates to an outgoing telephony communication initiated by the user telephony device, which means that rating information should be obtained from the rating unit 316. If the call-ID value does not include a telephone number of a user telephony device involved in the telephony communication, the CDR unit 314 determines that telephony communication must have been an incoming telephony communication, meaning there is no need to consult the rating unit 316 for rating information, because the user will not be charged for the incoming telephony communication.

A method as illustrated in FIG. 8, and as explained above, provides a mechanism for determining when it is necessary to obtain a rate for a telephony communication reflected in a CDR. If no rate is required, the CDR unit 314 need not send a request to the rating unit 316, which reduces the overall messaging traffic within the IP telephony system. Also, the rating unit 316 does not have to determine and forward rating information for CDRs that do not require rating, which also reduces the message traffic, as well as reducing the burden on the rating unit 316 itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method, performed by a telephony device, for sending a telephony communication setup request to an element of an Internet protocol (IP) telephony system, comprising:
    obtaining at least one data item that is associated with the telephony device, the at least one data item including a character representation of the time at which the telephony device last registered with the IP telephony system;
    encrypting the at least one data item to create an encrypted code;
    recording at least the encrypted code in a field of a telephony communication setup request; and
    sending the telephony communication setup request to the element of the IP telephony system.

2. The method of claim 1, where the recording step comprises recording at least the encrypted code in a call-ID field of a Session Initiation Protocol (SIP) Invite message.

3. The method of claim 1, wherein the obtaining step also comprises obtaining an identification number associated with the telephony device, and wherein the encrypting step comprises also encrypting the identification number to create the encrypted code.

4. The method of claim 3, wherein the identification number is a Media Access Control (MAC) address assigned to the telephony device.

5. The method of claim 1, wherein the obtaining step also comprises obtaining an identification number associated with the telephony device and a telephone number associated with the telephone device, and wherein the encrypting step comprises encrypting a string of characters that includes the identification number and the telephone number to create the encrypted code.

6. The method of claim 1, wherein the obtaining step also comprises obtaining an identification number associated with the telephony device, and wherein the encrypting step comprises encrypting a string of characters that includes the identification number and the character representation of the time at which the telephony device last registered with the IP telephony system to create the encrypted code.

7. The method of claim 1, wherein the obtaining step also comprises obtaining a telephone number associated with the telephony device, and wherein the encrypting step comprises encrypting a string of characters that includes the telephone number and the character representation of the time at which the telephony device last registered with the IP telephony system to create the encrypted code.

8. The method of claim 1, wherein the obtaining step also comprises obtaining an identification number associated with the telephony device and a telephone number associated with the telephony device, and wherein the encrypting step comprises encrypting a string of characters that includes the identification number, the telephone number, and the character representation of the time at which the telephony device last registered with the IP telephony system to create the encrypted code.

9. The method of claim 1, wherein the recording step comprises:
    determining a telephone number associated with the telephony device; and
    recording a character string that includes the telephone number and the encrypted code in a call-ID field of a telephony communication setup request.

10. The method of claim 1, wherein the obtaining step also comprises obtaining a character representation of the second-to-last time at which the telephony device registered with the IP telephony system, and wherein the encrypting step comprises:
    encrypting at least the character representation of the last time at which the telephony device registered with the IP telephony system to create a first encrypted code; and
    encrypting at least the character representation of the second-to-last time at which the telephony device registered with the IP telephony system to create a second encrypted code, and
    wherein the recording step comprises recording at least the first encrypted code and the second encrypted code in a field of the telephony communication setup request.

11. A method performed by an element of an Internet protocol (IP) telephony system for authenticating a telephony device that sends a telephony communication setup request, comprising:
    receiving a telephony communication setup request from the telephony device, wherein a first encrypted code is present in the telephony communication setup request, and wherein at least one data item that is associated with the telephony device is encrypted in the first encrypted code;
    obtaining at least one data item that is associated with the telephony device, wherein the at least one data item encrypted in the encrypted code and the obtained at least one data item both include a character representation of the time at which the telephony device last registered with the IP telephony system;

determining that the telephony device is authenticated if the obtained at least one data item matches the at least one data item encrypted in the first encrypted code; and determining that the telephony device is not authenticated if the obtained at least one data item does not match the at least one data item encrypted in the first encrypted code.

12. The method of claim 11, wherein:

the step of determining that the telephony device is authenticated comprises encrypting the obtained at least one data item to create a second encrypted code and determining that the telephony device is authenticated if the second encrypted code matches the first encrypted code; and the step of determining that the telephony device is not authenticated comprises determining that the telephony device is not authenticated if the second encrypted code does not match the first encrypted code.

13. The method of claim 11, wherein:

the step of determining that the telephony device is authenticated comprises decrypting the encrypted code to generate a character string, extracting at least one item of data from the character string, and determining that the telephony device is authenticated if the extracted at least one data item matches the obtained at least one data item; and the step of determining that the telephony device is not authenticated comprises determining that the telephony device is not authenticated if the extracted at least one data item does not match the obtained at least one data item.

14. The method of claim 11, wherein the receiving step comprises receiving a Session Initiation Protocol (SIP) Invite message from the telephony device.

15. The method of claim 14, wherein the first encrypted code is present in a call-ID field of the received SIP Invite message.

16. The method of claim 11, wherein the obtaining step comprises obtaining at least one data item that is associated with the telephony device from an element of the IP telephony system using a telephone number associated with the telephony device that is present in the telephony communication setup request.

17. The method of claim 11, wherein the at least one data item encrypted in the encrypted code and the obtained at least one data item both include an identification number associated with the telephony device.

18. The method of claim 17, wherein the identification number is a Media Access Control (MAC) address associated with the telephony device.

19. The method of claim 11, wherein the at least one data item encrypted in the encrypted code and the obtained at least one data item include an identification number associated with the telephony device and a telephone number associated with the telephony device.

20. The method of claim 11, wherein the at least one data item encrypted in the encrypted code and the obtained at least one data item also include an identification number associated with the telephony device.

21. The method of claim 11, wherein the at least one data item encrypted in the encrypted code and the obtained at least one data item also include a telephone number associated with the telephony device.

22. The method of claim 11, wherein the at least one data item encrypted in the encrypted code and the obtained at least one data item also include an identification number associated with the telephony device and a telephone number associated with the telephony device.

23. A method, performed by a telephony device, for sending a telephony communication setup request to an element of an Internet protocol (IP) telephony system, comprising:

obtaining at least one data item that is associated with the telephony device;

encrypting the at least one item to create an encrypted code;

determining a telephone number associated with the telephony device;

recording a character string that includes the telephone number and the encrypted code in a call-ID field of a telephony communication setup request; and sending the telephony communication setup request to the element of the IP telephony system.

\* \* \* \* \*